(12) United States Patent
Lo

(10) Patent No.: US 9,654,185 B2
(45) Date of Patent: May 16, 2017

(54) INTERACTIVE METHOD FOR COMMUNICATION WITH SMART MOBILE DEVICE AND INTERACTIVE COMMUNICATION SYSTEM USING THE SAME

(71) Applicant: GENERALPLUS TECHNOLOGY INC., Hsinchu (TW)

(72) Inventor: Li Sheng Lo, Zhubei (TW)

(73) Assignee: Generalplus Technology Inc., Hsinchu (TW)

( * ) Notice: Subject to any disclaimer, the term of this patent is extended or adjusted under 35 U.S.C. 154(b) by 0 days.

(21) Appl. No.: 15/136,422

(22) Filed: Apr. 22, 2016

(65) Prior Publication Data

US 2016/0315668 A1    Oct. 27, 2016

(30) Foreign Application Priority Data

Apr. 24, 2015    (TW) .............................. 104113245 A

(51) Int. Cl.
| | | |
|---|---|---|
| H04B 1/00 | (2006.01) | |
| H04L 27/00 | (2006.01) | |
| H04L 27/06 | (2006.01) | |
| H04B 5/00 | (2006.01) | |
| H04B 5/02 | (2006.01) | |

(52) U.S. Cl.
CPC ............. *H04B 5/0081* (2013.01); *H04B 5/02* (2013.01)

(58) Field of Classification Search
USPC ..... 375/219, 220, 222, 240, 240.26, 240.27, 375/257, 285, 284, 278, 295, 316, 324, 375/352, 346, 338, 339, 354, 371, 356, 375/375

See application file for complete search history.

(56) References Cited

U.S. PATENT DOCUMENTS

| | | | | |
|---|---|---|---|---|
| 8,290,434 | B2* | 10/2012 | Piemonte ............ | H04M 1/7253 455/41.1 |
| 9,207,079 | B2* | 12/2015 | Askarpour ............. | G01C 17/38 |
| 2013/0252666 | A1* | 9/2013 | Xin ..................... | G01R 33/0029 455/556.1 |
| 2013/0278207 | A1* | 10/2013 | Yoo ......................... | H02J 7/025 320/108 |
| 2013/0300351 | A1* | 11/2013 | Gu .......................... | H02J 7/025 320/108 |

(Continued)

*Primary Examiner* — Linda Wong
(74) *Attorney, Agent, or Firm* — Muncy, Geissler, Olds & Lowe, P.C.

(57) ABSTRACT

An interactive method for communication with a smart mobile device and an interactive communication system using the same are provided. The interactive communication system comprises an external device and a smart mobile device. The external device comprises a microprocessor circuit and an AC magnetic emitter. The microprocessor circuit is for encoding specific data into an encoded signal. The AC magnetic emitter is for converting the encoded signal into an AC magnetic signal. The smart mobile device comprises an E-compass sensor. In addition, the smart mobile device stores a specific application program for acquiring a magnetic variation of the E-compass sensor. When the magnetic variation of the E-compass sensor is greater than a threshold variation, the AC magnetic signal is decoded through the specific application program to obtain the specific data.

19 Claims, 9 Drawing Sheets

(56) References Cited

U.S. PATENT DOCUMENTS

| | | | | |
|---|---|---|---|---|
| 2014/0236479 A1* | 8/2014 | Janardhanan | G01C 21/165 | 701/512 |
| 2014/0357185 A1* | 12/2014 | Li | H04B 5/0031 | 455/41.1 |
| 2015/0326990 A1* | 11/2015 | Yeh | H04R 1/1041 | 381/311 |
| 2016/0007270 A1* | 1/2016 | Maor | G01R 33/028 | 455/434 |
| 2016/0014539 A1* | 1/2016 | Yeh | H04R 1/1041 | 381/309 |
| 2016/0165323 A1* | 6/2016 | Hollis | H04Q 9/00 | 340/870.16 |

* cited by examiner

INTERACTIVE METHOD FOR COMMUNICATION WITH SMART MOBILE DEVICE AND INTERACTIVE COMMUNICATION SYSTEM USING THE SAME

This application claims priority of No. 104113245 filed in Taiwan R.O.C. on Apr. 24, 2015 under 35 USC 119, the entire content of which is hereby incorporated by reference.

BACKGROUND OF THE INVENTION

Field of the Invention

The invention relates to the technology of interactively communicating with a smart mobile device, and more particularly to an interactive method for communication with a smart mobile device and an interactive communication system using the same.

Description of the Related Art

A smart-phone/smart tone is a mobile phone, which has an independent mobile operation system, and the mobile phone functions that can be expanded by installing programs, such as application software, games, and the like, and has the computing power and function better than those of the conventional feature phone. The initial smart-phone does not have many functions, but the later model has the additionally embedded with the functions of a portable media player, a digital camera, a light-emitting diode (LED) exposure assisting lamp, a pocket camcorder, a global position system (GPS), a near field communication (NFC), a gravity sensor, a level sensor and the like, so that it becomes a device with diversified functions. Many smart-phones further possess the high-resolution touch screen and webpage browser, and thus can display the standard webpage and the mobile-optimized webpage. The smart-phone further can implement the high-speed data access, cloud access and the like through the Wi-Fi and mobile broadband. Recently, the rapid development of the mobile application program market, the mobile commerce, the mobile phone game industry and the social instant messaging network also facilitates the people in using the smart-phones.

Furthermore, with the development of the smart mobile device (mobile phone or tablet computer), many external devices, such as Bluetooth headsets, near field communication printers and the like, interact with the smart mobile devices through software. However, the above-mentioned external devices use the original data transmission protocols. In addition, although the Bluetooth device has the low power and long-distance transmission advantages, its drawback resides in that the complicated setting procedures are required. In addition, although the near field communication device has the simple setting procedure, it cannot work with the low power the same as that of the Bluetooth device, and has the extremely short transmission distance. In addition, the two communication protocols cannot recognize the orientation of the external device relative to the smart mobile device. Furthermore, the ordinary children cannot play the external toys if the excessive settings need to be executed.

SUMMARY OF THE INVENTION

An object of the invention is to provide an interactive method for communication with a smart mobile device and an interactive communication system using the same, wherein the smart mobile device with the built-in specific application program is used to acquire the magnetic variation of an E-compass sensor of the smart mobile device to interact with an external device. This method can communicate with the external device according to the magnetic variation, and further can recognize the position of the external device relative to the smart mobile device.

In view of this, the invention provides an interactive communication method applicable to communication and interaction between an external device and a smart mobile device. The smart mobile device comprises an E-compass sensor and a rotation detector, the external device has an AC magnetic emitter. The interactive communication method comprises: providing a specific application program in the smart mobile device, wherein the specific application program is for acquiring a magnetic variation of the E-compass sensor. Executing operations of the external device comprise: encoding specific data into an encoded signal; and converting the encoded signal into an AC magnetic signal by the AC magnetic emitter. Executing operations of the smart mobile device comprise: detecting the magnetic variation of the E-compass sensor through the specific application program; reading a reading of the rotation detector through the specific application program when the magnetic variation of the E-compass sensor is greater than a threshold variation; judging whether a variation of the reading of the rotation detector falls within a predetermined range or not; judging the magnetic variation of the E-compass sensor as the AC magnetic signal when the variation of the reading of the rotation detector falls within the predetermined range; and decoding the AC magnetic signal to obtain the specific data.

The invention further provides an interactive communication system comprising an external device and a smart mobile device. The external device comprises a microprocessor circuit and an AC magnetic emitter. The microprocessor circuit is for encoding specific data into an encoded signal. The AC magnetic emitter is for converting the encoded signal into an AC magnetic signal. The smart mobile device comprises an E-compass sensor and a rotation detector. The E-compass sensor is for acquiring a magnetic variation. The rotation detector is for outputting a rotation reading. The smart mobile device stores a specific application program for acquiring the magnetic variation of the E-compass sensor. When the magnetic variation of the E-compass sensor is greater than a threshold variation, the smart mobile device reads the rotation reading of the rotation detector, and judges whether a variation of the rotation reading of the rotation detector falls within a predetermined range through the specific application program. When the variation of the rotation reading of the rotation detector falls within the predetermined range, the smart mobile device judges the magnetic variation of the E-compass sensor as the AC magnetic signal, and decodes the AC magnetic signal to obtain the specific data through the specific application program.

In the interactive communication method and the interactive communication system using the same according to a preferred embodiment of the present invention, the rotation detector is a gravity sensor, and wherein the step of judging whether the variation of the reading of the rotation detector falls within the predetermined range or not includes: reading an angle of a gravitational acceleration of the gravity sensor every predetermined time to obtain a read angle; comparing the read angle with a previously read angle read at a previous predetermined time to judge an angle variation; and judging whether the angle variation falls within the predetermined range. In another preferred embodiment, the rotation detector is a gyroscope. and the step of judging whether the variation of the reading of the rotation detector falls within the predetermined range or not includes: reading a tilt angle of the gyroscope every predetermined time to obtain a read tilt angle; comparing the read tilt angle with a previously read tilt angle read at a previous predetermined time to judge a variation of the tilt angle; and judging whether the variation of the tilt angle falls within the predetermined range.

In the interactive communication method and the interactive communication system using the same according to a preferred embodiment of the present invention, the AC magnetic emitter includes a coil and a capacitor, wherein one end of the coil is coupled to a common voltage, the other end of the coil is coupled to a first end of the capacitor, and a second end of the capacitor receives the encoded signal, wherein the step of encoding the specific data into the encoded signal includes: providing a specific frequency pulse, a frequency of the specific frequency pulse being substantially the same as a resonance frequency exhibited by the coil and the capacitor; and determining whether to transmit the specific frequency pulse to the second end of the capacitor or not according to bits of the specific data. Further, in a preferred embodiment, the step of converting the encoded signal into the AC magnetic signal by the AC magnetic emitter includes: sequentially transmitting the specific frequency pulse and the common voltage to the second end of the capacitor according to an order of the bits of the specific data, and generating the AC magnetic signal by way of resonance.

In the interactive communication method and the interactive communication system using the same according to a preferred embodiment of the present invention, the step of determining whether to transmit the specific frequency pulse to the second end of the capacitor or not according to the bits of the specific data includes: transmitting the specific frequency pulse to the second end of the capacitor in a front half cycle of a bit cycle, and transmitting the common voltage to the second end of the capacitor in a rear half cycle of the bit cycle when the bits of the specific data have a first logic; and transmitting the common voltage to the second end of the capacitor in the front half cycle of the bit cycle, and transmitting the specific frequency pulse to the second end of the capacitor in the rear half cycle of the bit cycle when the bits of the specific data have a second logic.

In the interactive communication method and the interactive communication system using the same according to a preferred embodiment of the present invention, the step of determining whether to transmit the specific frequency pulse to the second end of the capacitor or not according to the bits of the specific data includes: transmitting the specific frequency pulse to the second end of the capacitor in a front first time span of a bit cycle, and transmitting the common voltage to the second end of the capacitor in a rear second time span of the bit cycle when the bits of the specific data have a first logic; and transmitting the common voltage to the second end of the capacitor in a front second time span of the bit cycle, and transmitting the specific frequency pulse to the second end of the capacitor in a rear first time span of the bit cycle when the bits of the specific data have a second logic, wherein the first time span plus the second time span is equal to the bit cycle.

In the interactive communication method and the interactive communication system using the same according to a preferred embodiment of the present invention, the step of determining whether to transmit the specific frequency pulse to the second end of the capacitor or not according to the bits of the specific data includes: transmitting the specific frequency pulse to the second end of the capacitor in a first time span, and then transmitting the common voltage to the second end of the capacitor in a second time span when the bits of the specific data have a first logic; and transmitting the specific frequency pulse to the second end of the capacitor in a third time span, and then transmitting the common voltage to the second end of the capacitor in the second time span when the bits of the specific data have a second logic, wherein the first time span is longer than the third time span.

In the interactive communication method and the interactive communication system using the same according to a preferred embodiment of the present invention, the AC magnetic emitter comprises a coil and a capacitor, wherein one end of the coil is coupled to a common voltage, the other end of the coil is coupled to a first end of the capacitor, and a second end of the capacitor receives the encoded signal, wherein the step of encoding the specific data into the encoded signal includes: providing a specific frequency pulse, wherein a frequency of the specific frequency pulse is substantially the same as a resonance frequency exhibited by the coil and the capacitor; determining to provide an amplitude of the specific frequency pulse to the second end of the capacitor according to bits of the specific data. In a preferred embodiment, determining to provide the amplitude of the specific frequency pulse to the second end of the capacitor according to bits of the specific data includes: transmitting the specific frequency pulse with the one amplitude to the second end of the capacitor in a bit cycle when continuous two bits of the specific data have a first logic; transmitting the specific frequency pulse with a double of the amplitude to the second end of the capacitor in the bit cycle when a first bit of the continuous two bits of the specific data is the first logic, and a second bit of the continuous two bits of the specific data is a second logic; transmitting the specific frequency pulse with a triple of the amplitude to the second end of the capacitor in the bit cycle when the first bit of the continuous two bits of the specific data is the second logic, and the second bit of the continuous two bits of the specific data is the first logic; and transmitting the specific frequency pulse with a quadruple of the amplitude to the second end of the capacitor in the bit cycle when the continuous two bits of the specific data have the second logic.

The essence of the invention is to use the smart mobile device, having the E-compass sensor to interact with the external device outputting the external magnetic field through the specific application program installed in the smart mobile device to read the magnetic variation of the E-compass sensor of the smart mobile device. This method can communicate with the external device through the magnetic variation and further can recognize the relative position of the external device.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

In recent years, E-compass sensors are widely used on smart devices. When the E-compass sensor works in conjunction with a gravity sensor (G sensor) and a gyroscope, the functions of direction, gesture and the like can be provided. The typical E-compass sensor can detect the magnetic field and its intensity variation. In the processes of manufacturing the E-compass sensor, a nickel iron alloy film is deposited on a silicon crystal to form resistive strips. Four resistive strips are connected to form a Whiston bridge for measuring the intensity and the direction of the magnetic field along one single axis.

Figure 1:
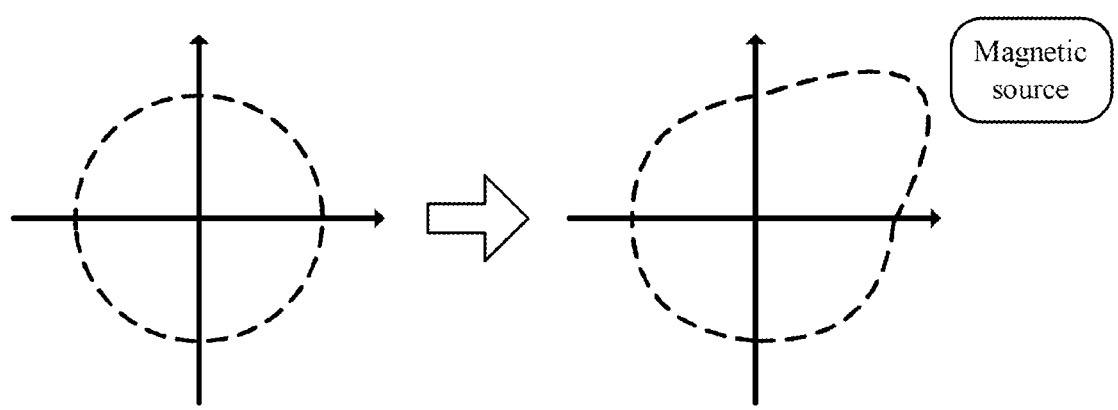
FIG. 1 is a schematic view showing the influence of an artificial magnetic source on an E-compass sensor.

If a weak and slow magnetic source is provided to the E-compass sensor, then the presence of this interference source can be found according to the read result of the E-compass sensor. FIG. 1 is a schematic view showing the influence of an artificial magnetic source on an E-compass sensor. As shown in FIG. 1, if the variation of this artificial magnetic source can be properly controlled, positioning recognition and data transmission functions can be achieved. Because the magnetic source must be recognized as being artificially generated, its magnetic field intensity must have variations. Furthermore, in order to remove the electromagnetic effect generated by the 50 Hz/60 Hz environment power from the typical E-compass sensor, the E-compass sensor is usually built with a low-pass filter. According to the experiments executed by the applicant, the magnetic field alternating at the frequency lower than or equal to 30 Hz can be recognized by the E-compass sensor.

Figure 2:
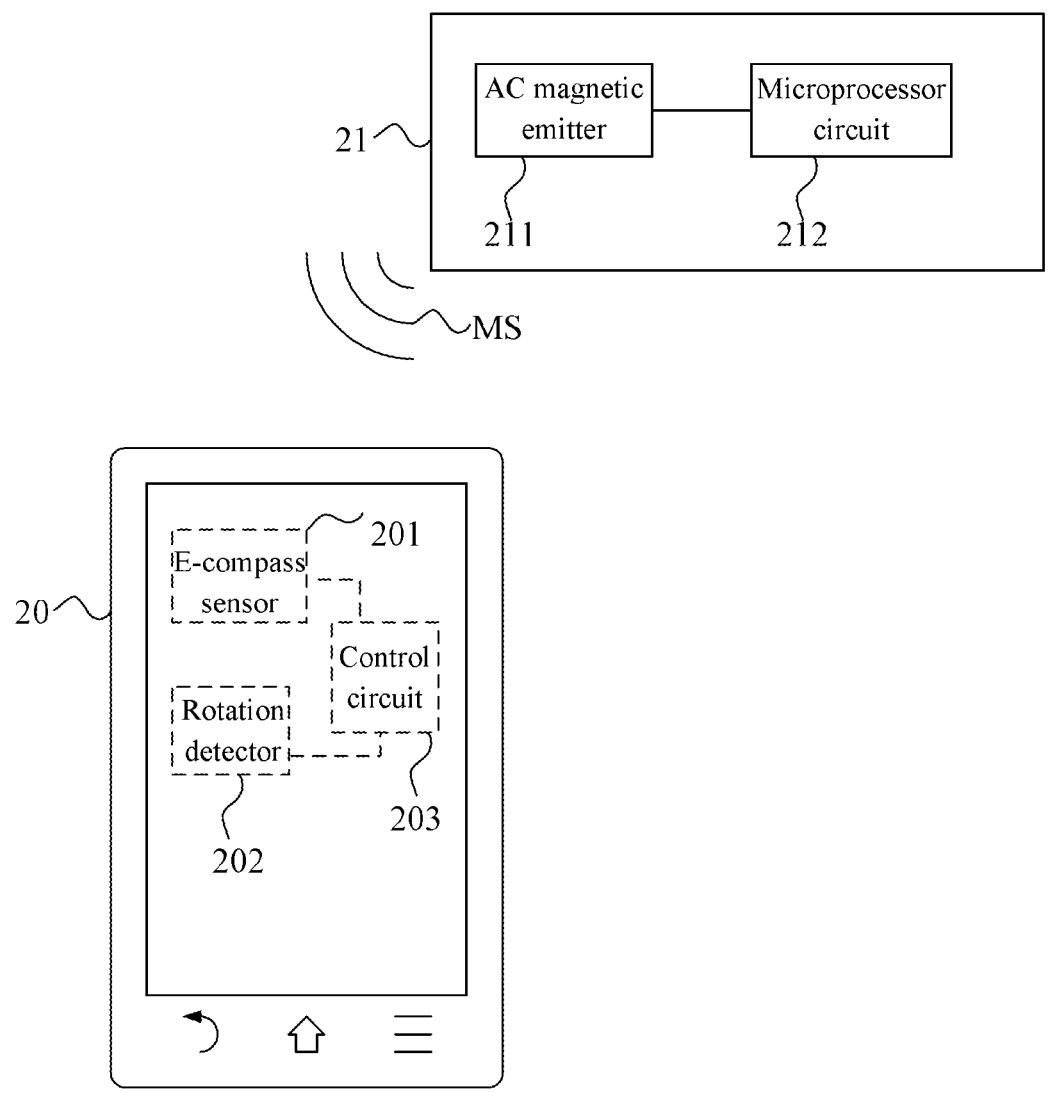
FIG. 2 is a system block diagram showing an interactive communication system according to a preferred embodiment of the invention.

FIG. 2 is a system block diagram showing an interactive communication system according to a preferred embodiment of the invention. Referring to FIG. 2, the interactive communication system comprises a smart mobile device 20 and an external device 21, wherein the smart mobile device 20 has an E-compass sensor 201, a rotation detector 202 and a control circuit 203. In addition, the external device 21 has an AC magnetic emitter 211 and a microprocessor circuit 212. Generally speaking, the external device 21 may be an interactive toy. Generally speaking, the rotation detector 202 is implemented by a gravity sensor or a gyroscope.

Figure 3:
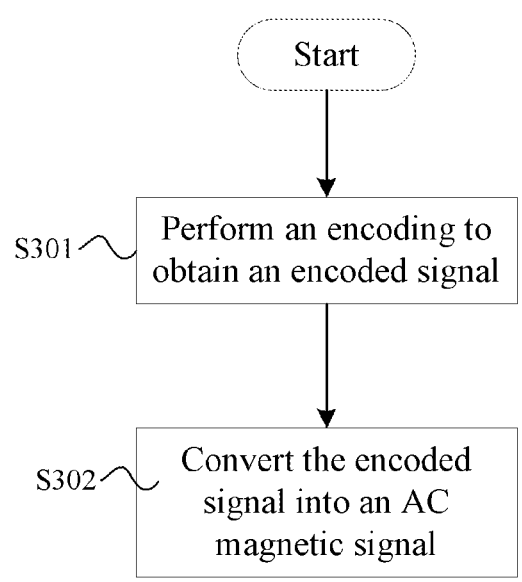
FIG. 3 is a flow chart showing steps of an interactive communication method executed by an external device 21 according to a preferred embodiment of the invention.

FIG. 3 is a flow chart showing steps of an interactive communication method executed by the external device 21 according to a preferred embodiment of the invention. Referring to FIG. 3, the steps executed by the external device 21 in this embodiment comprise steps S301 and S302.

Figure 4A:
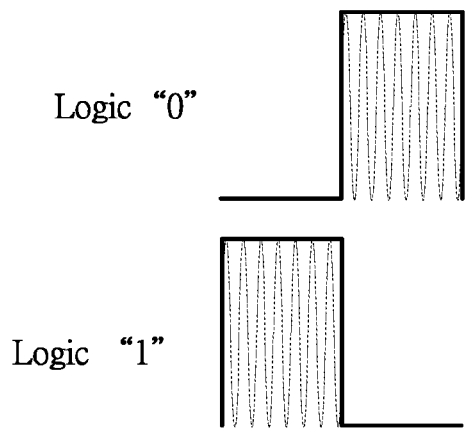
FIG. 4A is a schematic view showing encoding of the interactive communication method in the external device 21 according to the preferred embodiment of the invention.

In the step S301, the specific data to be transmitted to the smart mobile device 20 is encoded into an encoded signal. FIG. 4A is a schematic view showing encoding of the interactive communication method in the external device 21 according to the preferred embodiment of the invention. Generally speaking, referring to FIG. 4A, in order to keep the secrecy of the to-be-transmitted original data or decrease the error rate, the to-be-transmitted original data is always encoded. In this embodiment of FIG. 4A, Manchester encoding is adopted. Each cycle of Manchester encoding is divided into a front half period and a rear half period. When the original data is logic 0, a specific frequency pulse is transmitted in the front half period, and a common voltage is transmitted in the rear half period. Similarly, when the original data is logic 1, the common voltage is transmitted in the front half period, and the specific frequency pulse is transmitted in the rear half period. Those skilled in the art should know that the logic 1 and the logic 0 are only the design choice and can be exchanged with each other, and that the invention is not restricted thereto.

Figure 4B:
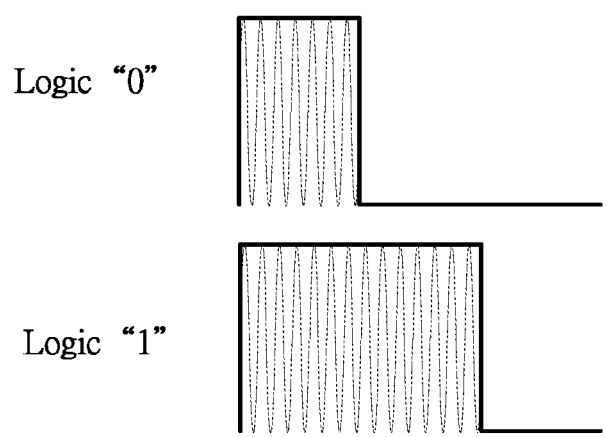
FIG. 4B is a schematic view showing encoding of the interactive communication method in the external device 21 according to the preferred embodiment of the invention.

FIG. 4B is a schematic view showing encoding of the interactive communication method in the external device 21 according to the preferred embodiment of the invention. Referring next to the embodiment of FIG. 4B, the pulse width modulation (PWM) encoding is adopted. The characteristic of the PWM encoding is to change the pulse width in one cycle, according to different to-be-transmitted data. When the original data is logic 0, the specific frequency pulse is transmitted for two time units, and then the common voltage is transmitted for one time uint. Similarly, when the original data is logic 1, the specific frequency pulse is transmitted for one time unit, and then the common voltage is transmitted for two time units. Similarly, those skilled in the art should know that the logic 1 and the logic 0 are only the design choice and can be exchanged with each other, and that the invention is not restricted thereto.

Figure 4C:
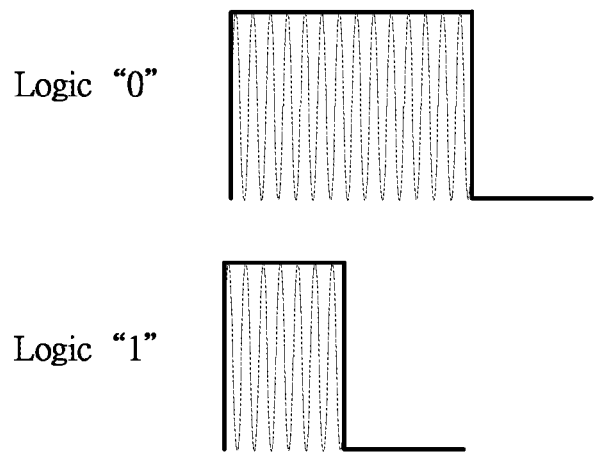
FIG. 4C is a schematic view showing encoding of the interactive communication method in the external device 21 according to the preferred embodiment of the invention.

FIG. 4C is a schematic view showing encoding of the interactive communication method in the external device 21 according to the preferred embodiment of the invention. Referring next to the embodiment of FIG. 4C, the pulse phase modulation (PPM) encoding is adopted. The characteristic of the PPM encoding is to change the pulse transmission time according to the different to-be-transmitted data, and to fix the width. When the original data is logic 0, the specific frequency pulse is transmitted for two time units, and then the common voltages is transmitted for one time unit. Similarly, when the original data is logic 1, the specific frequency pulse is transmitted for one time unit, and then the common voltages is transmitted for one time unit. Similarly, those skilled in the art should know that the logic 1 and the logic 0 are only the design choice and can be exchanged with each other, and that the invention is not restricted thereto.

Figure 4D:
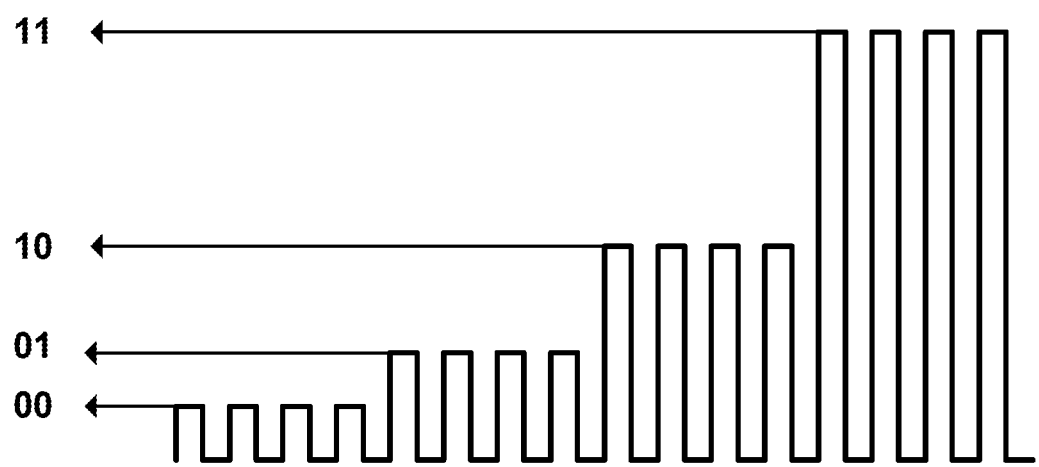
FIG. 4D is a schematic view showing encoding of the interactive communication method in the external device 21 according to the preferred embodiment of the invention.

FIG. 4D is a schematic view showing encoding of the interactive communication method in the external device 21 according to the preferred embodiment of the invention. Referring next to the embodiment of FIG. 4D, the amplitude shift keying (ASK) encoding is adopted. The characteristic of the ASK encoding is to change the amplitude of the pulse according to different to-be-transmitted data. When the original data is logic "00", the specific frequency pulse with one-time amplitude is transmitted. When the original data is logic "01", the specific frequency pulse with the doubled amplitude is transmitted. When the original data is logic "10", the specific frequency pulse with the quadrupled amplitude is transmitted. When the original data is logic "11", the specific frequency pulse with the eight-time amplitude is transmitted. Those skilled in the art should know that the logic "00, 01, 10, 11" is only the design choice and can be exchanged with each other, and that the invention is not restricted thereto.

Figure 5:
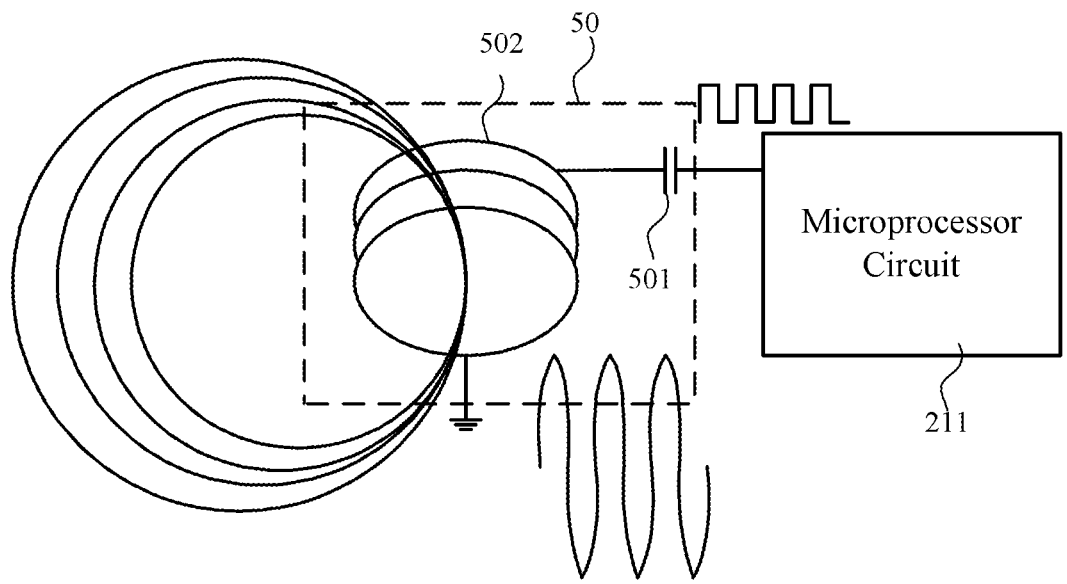
FIG. 5 is a circuit diagram showing the external device 21 of the interactive communication system according to the preferred embodiment of the invention.

In the step S302, the AC magnetic emitter 211 converts the encoded signal into an AC magnetic signal MS. FIG. 5 is a circuit diagram showing the external device 21 of the interactive communication system according to the preferred embodiment of the invention. Referring to FIG. 5, a generally simple method of generating the AC magnetic field is to move a coil through an AC signal to generate the magnetic field. In this embodiment, the AC magnetic emitter 211 is implemented by a resonance circuit 50 composed of a capacitor 501 and a coil 502. Thus, the frequency of the specific frequency pulse is the resonance frequency of the resonance circuit 50. In this embodiment, the AC magnetic field is generated on the coil 502 by the LC resonance of the inductor and the capacitor.

Figure 6:
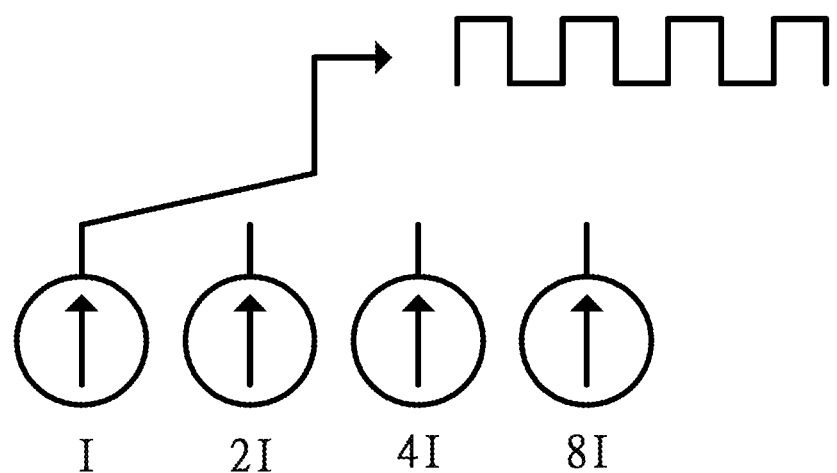
FIG. 6 is a partial circuit diagram showing a microprocessor circuit 212 of the external device 21 of the interactive communication system according to the preferred embodiment of the invention.

FIG. 6 is a partial circuit diagram showing the microprocessor circuit 212 of the external device 21 of the interactive communication system according to the preferred embodiment of the invention. Referring to FIG. 6, when being applied to the encoding of FIG. 4D, the magnetic field intensity on the coil 502 may be changed by controlling the current or amplitude of the signal. In this embodiment, the microprocessor circuit 212 comprises four current sources with different intensities. Because the magnetic field intensity on the coil 502 may be changed by controlling the current or amplitude of the signal, the microprocessor circuit 212 of this embodiment generates different amplitudes using different current sources.

Figure 7:
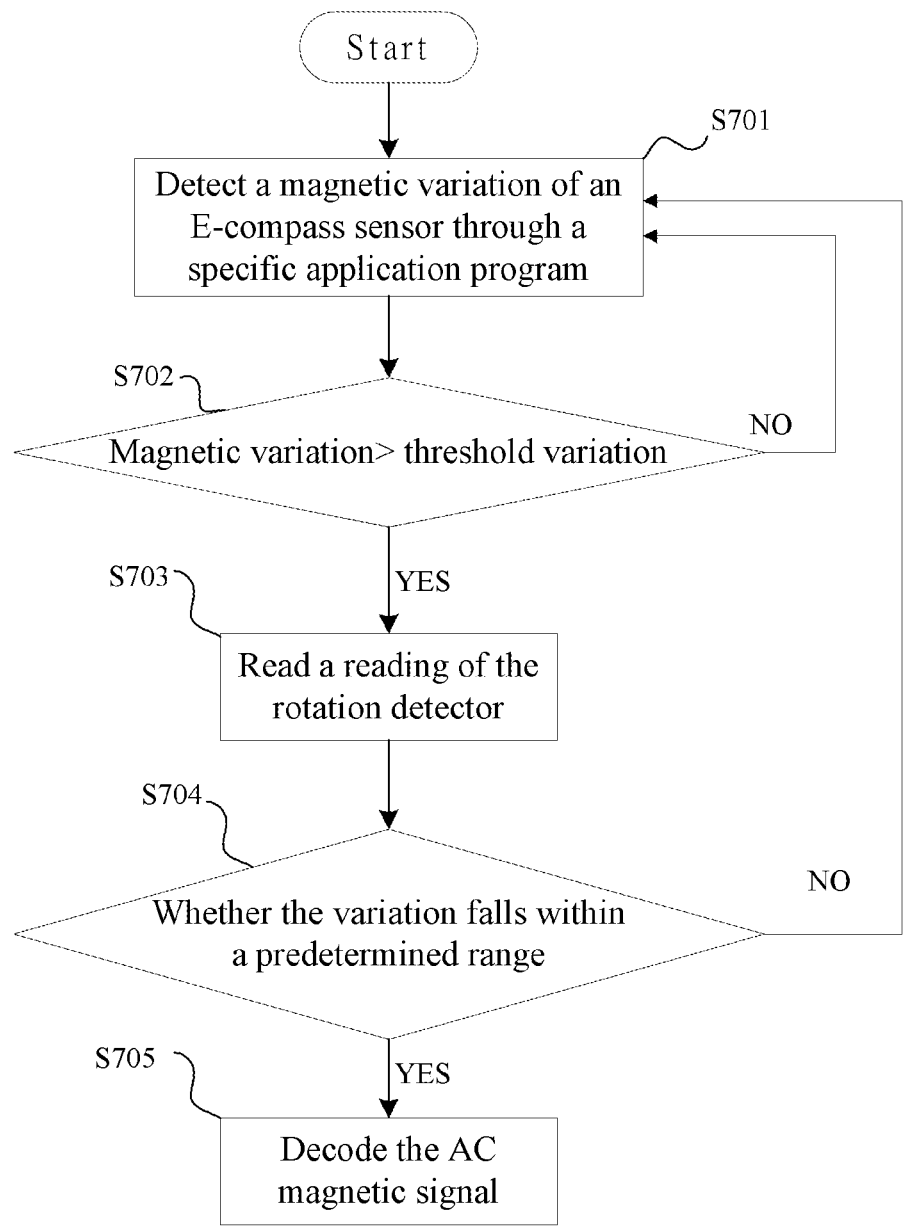
FIG. 7 is a flow chart showing steps of the interactive communication method executed by a smart mobile device 20 according to the preferred embodiment of the invention.

FIG. 7 is a flow chart showing steps of the interactive communication method executed by the smart mobile device 20 according to the preferred embodiment of the invention. Referring to FIG. 7, the executing operation of the smart mobile device 20 comprises steps S701 to S705.

In the step S701, the magnetic variation of the E-compass sensor is detected through a specific application program, which is an application program designed in correspondence with the external device 21, for example. This application program is mainly used to determine whether the magnetic variation detected by the E-compass sensor in the smart mobile device 20 is meaningful data or not.

In the step S702, it is judged whether the detected magnetic variation of the E-compass sensor is greater than a threshold variation or not. If the judged result is negative, then the process returns to the step S701 to continue the detection. If the judged result is affirmative, then the step S703 is performed.

In the step S703, the reading of the rotation detector is read through the specific application program. When the mobile device is moved, its inner E-compass sensor reads the magnetic field reading variation. At this time, the reading of the rotation detector 202, such as the gravity sensor or the gyroscope, must be referred.

In the step S704, it is judged whether the reading variation of the rotation detector 202 falls within a predetermined range. If the reading of the rotation detector 202 has no significant variation, it represents that the magnetic field reading variation comes from the external device 21. At this time, the step S705 is performed. If the reading of the rotation detector 202 has the significant variation, the read result of the E-compass sensor must be ignored, and the process returns to the step S701.

In the step S705, when the reading variation of the rotation detector falls within the predetermined range, the magnetic variation of the E-compass sensor is determined as the AC magnetic signal, and the AC magnetic signal is decoded into the specific data transmitted by the external device 21.

Figure 8:
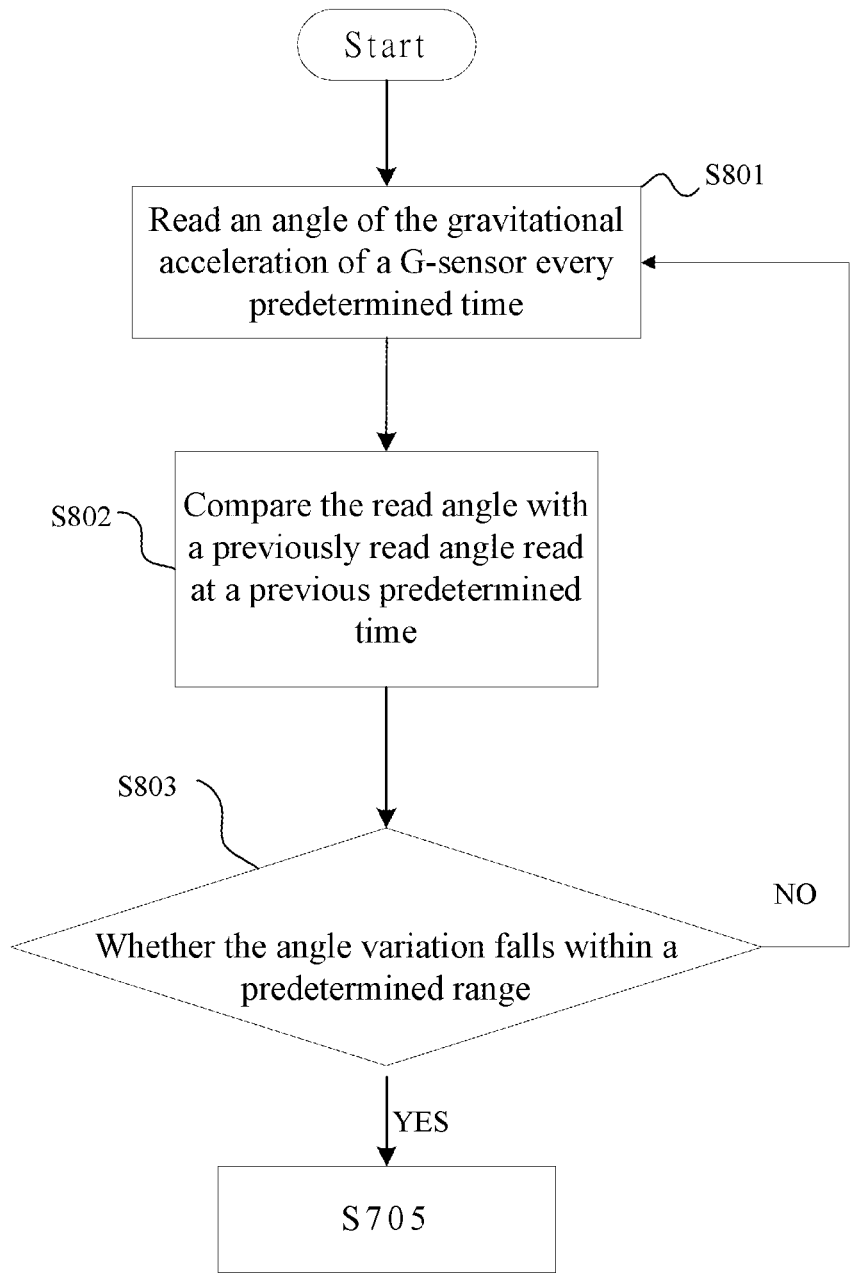
FIG. 8 is a flow chart showing detailed steps of step S704 of the interactive communication method in the smart mobile device 20 according to the preferred embodiment of the invention.

FIG. 8 is a flow chart showing detailed steps of the step S704 of the interactive communication method in the smart mobile device 20 according to the preferred embodiment of the invention. Referring to FIG. 8, when the rotation detector is a gravity sensor, the step S704 comprises the following steps S801 to S803.

In the step S801: an angle of the gravitational acceleration of the gravity sensor is read every predetermined time.

In the step S802, the read angle is compared with the previously read angle read at a predetermined time to judge the angle variation.

In the step S803, it is judged whether the angle variation falls within a predetermined range. If the angle variation falls within the predetermined range, it represents that the magnetic field reading variation comes from the external device 21. At this time, the step S705 is performed. If the reading of the gravity sensor has the significant variation, then the read result of the gravity sensor must be ignored, and the process returns to the step S801.

Figure 9:
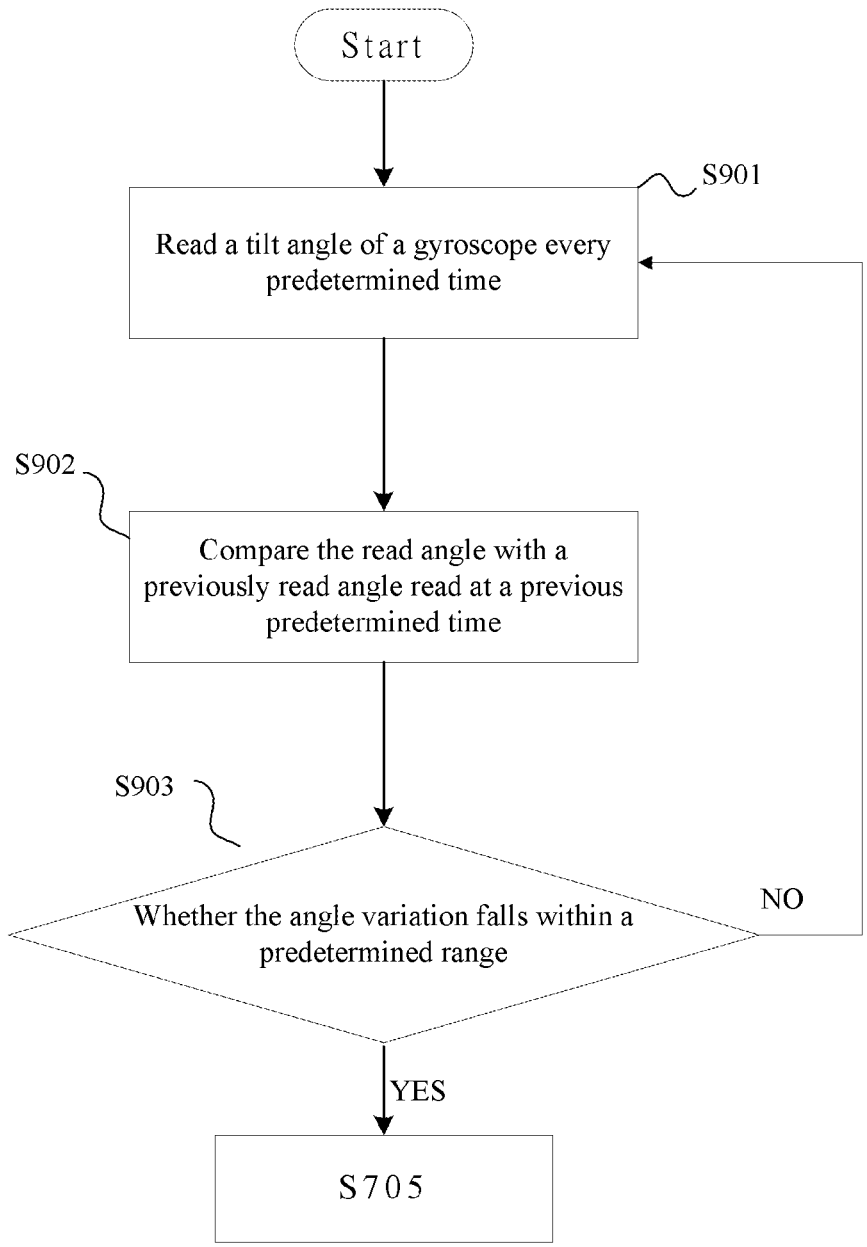
FIG. 9 is a flow chart showing detailed steps of step S704 of the interactive communication method in the smart mobile device 20 according to the preferred embodiment of the invention.

FIG. 9 is a flow chart showing detailed steps of step S704 of the interactive communication method in the smart mobile device 20 according to the preferred embodiment of the invention. Referring to FIG. 9, when the rotation detector is a gyroscope, the step S704 comprises the following steps S901 to S903.

In the step S901, a tilt angle of the gyroscope is read every predetermined time.

In the step S902, the read tilt angle is compared with the previously read tilt angle read at a previous predetermined time to judge the variation of the tilt angle.

In the step S903, it is judged whether the variation of the tilt angle falls within a predetermined range. If the angle variation falls within the predetermined range, it represents that the magnetic field reading variation comes from the external device 21. At this time, the step S705 is performed. If the reading of the gyroscope has the significant variation, then the read result of the E-compass sensor must be ignored, and the process returns to the step S901.

In summary, the essence of the invention is to use the smart mobile device, having the E-compass sensor to interact with the external device outputting the external magnetic field through the specific application program installed in the smart mobile device to read the magnetic variation of the E-compass sensor of the smart mobile device. This method can communicate with the external device through the magnetic variation and further can recognize the relative position of the external device.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An interactive communication method applicable to communication and interaction between an external device and a smart mobile device, wherein the smart mobile device comprises an E-compass sensor and a rotation detector, the external device has an AC magnetic emitter, and the interactive communication method comprises:
   providing a specific application program in the smart mobile device, wherein the specific application program is for acquiring a magnetic variation of the E-compass sensor;
   wherein executing operations of the external device comprise:
   encoding specific data into an encoded signal; and
   converting the encoded signal into an AC magnetic signal by the AC magnetic emitter; and
   wherein executing operations of the smart mobile device comprise:
   detecting the magnetic variation of the E-compass sensor through the specific application program;
   reading a reading of the rotation detector through the specific application program when the magnetic variation of the E-compass sensor is greater than a threshold variation;
   judging whether a variation of the reading of the rotation detector falls within a predetermined range or not;
   judging the magnetic variation of the E-compass sensor as the AC magnetic signal when the variation of the reading of the rotation detector falls within the predetermined range; and
   decoding the AC magnetic signal into the specific data.

2. The interactive communication method according to claim 1, wherein the rotation detector is a gravity sensor, and wherein the step of judging whether the variation of the reading of the rotation detector falls within the predetermined range or not comprises:
   reading an angle of a gravitational acceleration of the gravity sensor every predetermined time to obtain a read angle;
   comparing the read angle with a previously read angle read at a previous predetermined time to judge an angle variation; and
   judging whether the angle variation falls within the predetermined range.

3. The interactive communication method according to claim 1, wherein the rotation detector is a gyroscope, wherein the step of judging whether the variation of the reading of the rotation detector falls within the predetermined range or not comprises:
   reading a tilt angle of the gyroscope every predetermined time to obtain a read tilt angle;
   comparing the read tilt angle with a previously read tilt angle read at a previous predetermined time to judge a variation of the tilt angle; and
   judging whether the variation of the tilt angle falls within the predetermined range.

4. The interactive communication method according to claim 1, wherein the AC magnetic emitter comprises a coil and a capacitor, wherein one end of the coil is coupled to a common voltage, the other end of the coil is coupled to a first end of the capacitor, and a second end of the capacitor receives the encoded signal, wherein the step of encoding the specific data into the encoded signal comprises:
   providing a specific frequency pulse, a frequency of the specific frequency pulse being substantially the same as a resonance frequency exhibited by the coil and the capacitor; and
   determining whether to transmit the specific frequency pulse to the second end of the capacitor or not according to bits of the specific data.

5. The interactive communication method according to claim 4, wherein the step of converting the encoded signal into the AC magnetic signal by the AC magnetic emitter comprises:
   sequentially transmitting the specific frequency pulse and the common voltage to the second end of the capacitor according to an order of the bits of the specific data, and generating the AC magnetic signal by way of resonance.

6. The interactive communication method according to claim 4, wherein the step of determining whether to transmit the specific frequency pulse to the second end of the capacitor or not according to the bits of the specific data comprises:
   transmitting the specific frequency pulse to the second end of the capacitor in a front half cycle of a bit cycle, and transmitting the common voltage to the second end of the capacitor in a rear half cycle of the bit cycle when the bits of the specific data have a first logic; and
   transmitting the common voltage to the second end of the capacitor in the front half cycle of the bit cycle, and transmitting the specific frequency pulse to the second end of the capacitor in the rear half cycle of the bit cycle when the bits of the specific data have a second logic.

7. The interactive communication method according to claim 4, wherein the step of determining whether to transmit the specific frequency pulse to the second end of the capacitor or not according to the bits of the specific data comprises:
   transmitting the specific frequency pulse to the second end of the capacitor in a front first time span of a bit cycle, and transmitting the common voltage to the second end of the capacitor in a rear second time span of the bit cycle when the bits of the specific data have a first logic; and
   transmitting the common voltage to the second end of the capacitor in a front second time span of the bit cycle, and transmitting the specific frequency pulse to the second end of the capacitor in a rear first time span of the bit cycle when the bits of the specific data have a second logic,
   wherein the first time span plus the second time span is equal to the bit cycle.

8. The interactive communication method according to claim 4, wherein the step of determining whether to transmit the specific frequency pulse to the second end of the capacitor or not according to the bits of the specific data comprises:
   transmitting the specific frequency pulse to the second end of the capacitor in a first time span, and then transmitting the common voltage to the second end of the capacitor in a second time span when the bits of the specific data have a first logic; and
   transmitting the specific frequency pulse to the second end of the capacitor in a third time span, and then transmitting the common voltage to the second end of the capacitor in the second time span when the bits of the specific data have a second logic, wherein the first time span is longer than the third time span.

9. The interactive communication method according to claim 1, wherein the AC magnetic emitter comprises a coil and a capacitor, wherein one end of the coil is coupled to a common voltage, the other end of the coil is coupled to a first end of the capacitor, and a second end of the capacitor receives the encoded signal, wherein the step of encoding the specific data into the encoded signal comprises:
  providing a specific frequency pulse, wherein a frequency of the specific frequency pulse is substantially the same as a resonance frequency exhibited by the coil and the capacitor;
  determining to provide an amplitude of the specific frequency pulse to the second end of the capacitor according to bits of the specific data.

10. The interactive communication method according to claim 9, wherein determining to provide the amplitude of the specific frequency pulse to the second end of the capacitor according to bits of the specific data comprises:
  transmitting the specific frequency pulse with the one amplitude to the second end of the capacitor in a bit cycle when continuous two bits of the specific data have a first logic;
  transmitting the specific frequency pulse with a double of the amplitude to the second end of the capacitor in the bit cycle when a first bit of the continuous two bits of the specific data is the first logic, and a second bit of the continuous two bits of the specific data is a second logic;
  transmitting the specific frequency pulse with a triple of the amplitude to the second end of the capacitor in the bit cycle when the first bit of the continuous two bits of the specific data is the second logic, and the second bit of the continuous two bits of the specific data is the first logic; and
  transmitting the specific frequency pulse with a quadruple of the amplitude to the second end of the capacitor in the bit cycle when the continuous two bits of the specific data have the second logic.

11. An interactive communication system, comprising:
  an external device, comprising:
  a microprocessor circuit for encoding specific data into an encoded signal; and
  an AC magnetic emitter for converting the encoded signal into an AC magnetic signal; and
  a smart mobile device, comprising:
  an E-compass sensor for acquiring a magnetic variation; and
  a rotation detector for outputting a rotation reading;
  wherein the smart mobile device stores a specific application program for acquiring the magnetic variation of the E-compass sensor,
  wherein when the magnetic variation of the E-compass sensor is greater than a threshold variation, the smart mobile device reads the rotation reading of the rotation detector, and judges whether a variation of the rotation reading of the rotation detector falls within a predetermined range through the specific application program,
  wherein when the variation of the rotation reading of the rotation detector falls within the predetermined range, the smart mobile device judges the magnetic variation of the E-compass sensor as the AC magnetic signal, and decodes the AC magnetic signal into the specific data through the specific application program.

12. The interactive communication system according to claim 11, wherein the rotation detector is a gravity sensor, wherein when the magnetic variation of the E-compass sensor is greater than the threshold variation, the specific application program is executed to read an angle of a gravitational acceleration of the gravity sensor every predetermined time to obtain a read angle, to compare the read angle with a previously read angle read at a previous predetermined time to judge an angle variation, and then to judge whether the angle variation falls within the predetermined range.

13. The interactive communication system according to claim 11, wherein the rotation detector is a gyroscope, wherein when the magnetic variation of the E-compass sensor is greater than the threshold variation, the specific application program is executed to read a tilt angle of the gyroscope every predetermined time to obtain a read tilt angle, to compare the read tilt angle with a previously read tilt angle read at a previous predetermined time, to judge a variation of the tilt angle, and then to judge whether the variation of the tilt angle falls within the predetermined range.

14. The interactive communication system according to claim 11, wherein the AC magnetic emitter comprises:
  a coil comprising a first end and a second end, wherein the first end of the coil is coupled to a common voltage; and
  a capacitor comprising a first end and a second end, wherein the first end of the capacitor is coupled to the second end of the coil, and the second end of the capacitor receives the encoded signal,
  wherein the microprocessor circuit is coupled to the second end of the capacitor to provide the encoded signal,
  wherein the microprocessor circuit performs the encoding according to bits of the specific data and valid and invalid states of a specific frequency pulse,
  wherein a frequency of the specific frequency pulse is substantially the same as a resonance frequency exhibited by the coil and the capacitor.

15. The interactive communication system according to claim 14, wherein,
  when the bits of the specific data have a first logic, the microprocessor circuit transmits the specific frequency pulse to the second end of the capacitor in a front half cycle of a bit cycle, and the microprocessor circuit transmits the common voltage to the second end of the capacitor in a rear half cycle of the bit cycle,
  when the bits of the specific data have a second logic, the microprocessor circuit transmits the common voltage to the second end of the capacitor in the front half cycle of the bit cycle, and the microprocessor circuit transmits the specific frequency pulse to the second end of the capacitor in the rear half cycle of the bit cycle.

16. The interactive communication system according to claim 14, wherein,
  when the bits of the specific data have a first logic, the microprocessor circuit transmits the specific frequency pulse to the second end of the capacitor, and the microprocessor circuit transmits the common voltage to the second end of the capacitor in a rear second time span of a bit cycle,
  when the bits of the specific data have a second logic, the microprocessor circuit transmits the common voltage to the second end of the capacitor in a front second time span of a bit cycle, and the microprocessor circuit transmits the specific frequency pulse to the second end of the capacitor in a rear first time span of the bit cycle,
  wherein the first time span plus the second time span is equal to the bit cycle.

17. The interactive communication system according to claim 14, wherein,
- when the bits of the specific data have a first logic, the microprocessor circuit transmits the specific frequency pulse to the second end of the capacitor in a first time span, and then the microprocessor circuit transmits the common voltage to the second end of the capacitor in a second time span,
- when the bits of the specific data have a second logic, the microprocessor circuit transmits the specific frequency pulse to the second end of the capacitor in a third time span, and then the microprocessor circuit transmits the common voltage to the second end of the capacitor the second time span,
- wherein the first time span is greater than the third time span.

18. The interactive communication system according to claim 11, wherein the AC magnetic emitter comprises:
- a coil comprising a first end and a second end, wherein the first end of the coil is coupled to a common voltage; and
- a capacitor comprising a first end and a second end, wherein the first end of the capacitor is coupled to the second end of the coil, and the second end of the capacitor receives the encoded signal,
- wherein the microprocessor circuit is coupled to the second end of the capacitor to provide the encoded signal,
- wherein the microprocessor circuit determine to provide an amplitude of a specific frequency pulse to the second end of the capacitor according to bits of the specific data to perform the encoding,
- wherein a frequency of the specific frequency pulse is substantially the same as a resonance frequency exhibited by the coil and the capacitor.

19. The interactive communication system according to claim 18, wherein,
- when continuous two bits of the specific data have a first logic, the microprocessor circuit transmits the specific frequency pulse with the one amplitude to the second end of the capacitor in a bit cycle;
- when a first bit of the continuous two bits of the specific data is the first logic, and a second bit of the continuous two bits of the specific data is a second logic, the microprocessor circuit transmits the specific frequency pulse with a double of the amplitude to the second end of the capacitor in the bit cycle;
- when a first bit of the continuous two bits of the specific data is the second logic, and a second bit of the continuous two bits of the specific data is the first logic, the microprocessor circuit transmits the specific frequency pulse with a triple of the amplitude to the second end of the capacitor in the bit cycle; and
- when the continuous two bits of the specific data is the second logic, the microprocessor circuit transmits the specific frequency pulse with a quadruple of the amplitude to the second end of the capacitor in the bit cycle.

* * * * *